Sept. 25, 1951 J. HEYROVSKÝ 2,569,100
APPARATUS FOR ELECTROLYTIC INVESTIGATION
OF SOLUTIONS
Filed Oct. 1, 1947
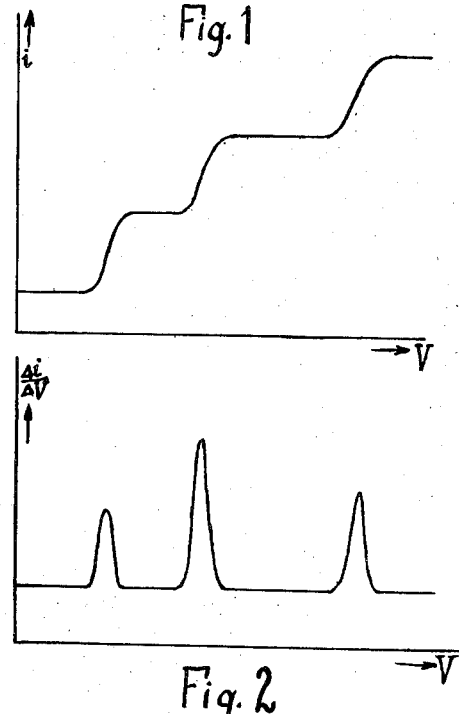
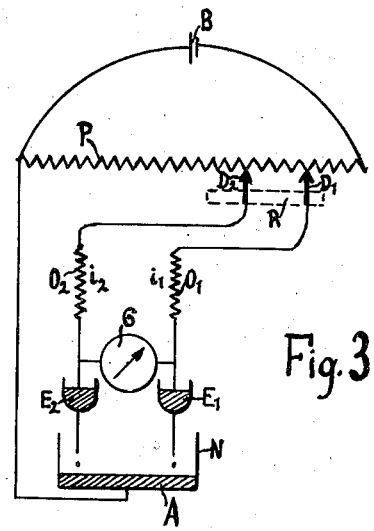
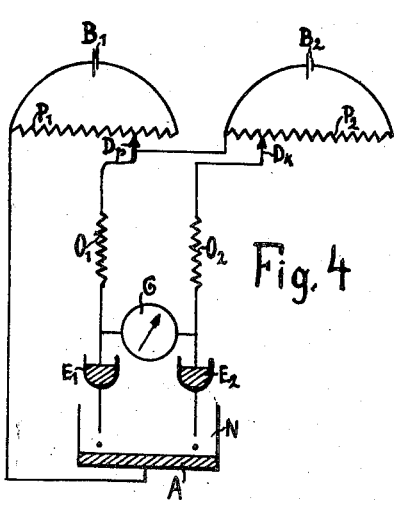
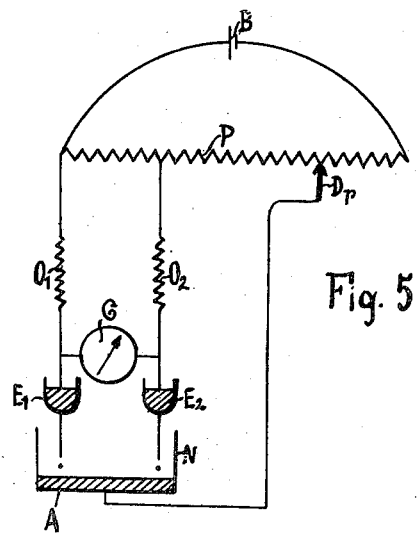
Inventor:
Jaroslav Heyrovský
by Singer, Ehlert, Stern & Carlberg
Attorneys.

Patented Sept. 25, 1951

2,569,100

UNITED STATES PATENT OFFICE 2,569,100

APPARATUS FOR ELECTROLYTIC INVESTIGATION OF SOLUTIONS

Jaroslav Heyrovský, Prague, Czechoslovakia, assignor to Zbrojovka Brno, Narodni Podnik (also named Brno Arms Factory, National Corporation), Prague, Czechoslovakia, a corporation of Czechoslovakia Application October 1, 1947, Serial No. 777,223
In Czechoslovakia October 2, 1946

2 Claims. (Cl. 175—183)

1

This invention relates to a method for electrolytic investigation of solutions, particularly for analytical purposes.

The known methods of electrolytic investigation of solutions consist of the determination of current-voltage curves. These known methods are insufficient in several respects and the apparatus which records such curves has certain limitations.

It is an object of the invention to determine the first derivative of the current-voltage curve in the electrolytic investigation of solutions and to record this curve continuously.

In the drawing:

Fig. 1 shows a known current-voltage curve diagram,

Fig. 2 shows the curve obtained by the use of the present invention, and

The Figs. 3 to 5 show each diagrammatically a different embodiment of the apparatus of the present invention.

It has now been discovered that the shortcoming of these known methods may be substantially overcome by determining, instead of the above mentioned curve $i=f(V)$, its first derivative $$f'(V) = \frac{di}{dV}$$

Fig. 1 gives the curve used and obtained by the known methods. Here with the increasing voltage, V, the current $i$ shows in general tendency to increase.

When this known method is used with the automatic recording polarograph, the height of the record in the direction of the current $i$ is limited by the width of the paper. This prevents in many cases the carrying out of a full analysis.

Fig. 2 shows the curve obtained by the use of the present invention, i. e. the derivative of the curve in Fig. 1. This derivative gives a good survey of the electrochemical processes taking place during electrolysis. It will thus be seen that the analytical investigations are not limited by the width of the paper, since after each peak the curve returns back to the zero position. By means of the derivative curve small amounts of metals such as cadmium (Cd), zinc (Zn), nickel (Ni), manganese (Mn) in a solution may be determined in the presence of a great excess of other metals such as copper (Cu), lead (Pb), bismuth (Bi) which previously was unattainable. The new method also eliminates to a large extent the undesirable "charging current."

The present invention is most readily carried into effect by using two polarizable electrodes at

2 a constant difference of potential, and an unpolarizable electrode to which a gradually increasing voltage is applied together with one of the polarizable electrodes.

Fig. 3 shows a circuit diagram of the apparatus used in a preferred embodiment of the invention and embodying polarizable mercury electrodes. The cell B is in circuit with the potentiometer wire P, along which move two sliding contacts $D_1$ and $D_2$ fixed to an arm, shown by the dotted curve R. The contact $D_1$ leads through the resistance $O_1$ to the dropping mercury electrode $E_1$ and similarly $D_2$ leads through $O_2$ to the dropping mercury electrode $E_2$. The large unpolarizable mercury electrode A at the bottom of the vessel N is connected to one pole of the cell B. Between the two dropping mercury electrodes is circuited the mirror galvanometer G, which by known means reflects a beam of light for the photographic record.

When the two coupled contacts $D_1$ and $D_2$ move along the potentiometric wire P, the voltage applied to the unpolarizable electrode A and to one of the polarizable electrodes $E_1$ or $E_2$ is steadily increased. The galvanometer G shows the difference of currents $i_1 - i_2 = \Delta i$ and the curve produced by plotting the series of values obtained is the derivative curve $$\frac{\Delta i}{\Delta V} = f'(V)$$

(as shown in Fig. 2). The difference between the potentials of the polarizable electrodes $E_1$ and $E_2$ remains constant and equal to $\Delta V$. This difference of potential may be changed by changing the position of the contacts on the arm R and for this reason one of the contacts say $D_2$ is adjustable.

Fig. 4 shows the circuit diagram of an embodiment of the invention in which there is only one sliding contact $D_p$, and this moves along the potentiometer wire $P_1$, connected to the cell $B_1$. The second contact $D_k$ remains fixed in its position on the second potentiometer wire $P_2$, connected to the cell $B_2$. The beginning of the second potentiometer wire $P_2$ is connected to the sliding contact $D_p$. Otherwise the connections are the same as those shown in Fig. 3. By moving the contact $D_p$ the voltage acting on one of the polarizable electrodes $E_1$ or $E_2$ and on unpolarizable electrode A is varied. The difference of potentials of the electrodes $E_1$ and $E_2$ is constant and its value is given by the potential of the contact $D_k$ on the potentiometer wire $P_2$. This may be varied by shifting the contact $D_k$ to another point on the wire $P_2$.

Fig. 5 shows the circuit diagram of a further embodiment of the invention using only one potentiometer wire P and one sliding contact $D_p$. The polarizable electrodes $E_1$ and $E_2$ are connected through resistances $O_1$ and $O_2$ with the wire P by fixed contacts. The unpolarizable electrode A is joined to the potentiometer wire P by means of the sliding contact $D_p$, the movement of which causes changes of the voltage acting on one of the polarizable electrodes $E_1$ or $E_2$ and on the non-polarizable electrode A.

The voltage change may also be effected by means other than that of movement of a contact along a potentiometer wire.

What I claim as my invention is:

1. In an apparatus for electrolytical investigation of solutions by the determination of the first differential derivative of the current voltage curve, an electrolytic cell, two polarizable electrodes and a third unpolarizable electrode in said cell, means for maintaining a constant voltage across said polarizable electrodes, means for impressing a continuously changing voltage across one of said polarizable electrodes and the unpolarizable electrode, and measuring apparatus connected between said polarizable electrodes.

2. In an apparatus for electrolytically investigating solutions, an electrolytic cell, two polarizable electrodes in said cell, a potentiometer, means connecting said electrodes with said potentiometer including two mechanically coupled slide contacts, a fixed contact, and a third unpolarizable electrode in said cell connected to said potentiometer by said fixed contact, and a mirror galvanometer connected between the two polarizable electrodes for determining the difference in currents.

JAROSLAV HEYROVSKÝ.

REFERENCES CITED

The following references are of record in the file of this patent:

UNITED STATES PATENTS

| Number | Name | Date |
| --- | --- | --- |
| 1,450,023 | Edelman | Mar. 27, 1923 |
| 1,912,188 | Gann | May 30, 1933 |
| 2,246,981 | Matheson et al. | June 24, 1941 |
| 2,273,363 | Lipson | Feb. 17, 1942 |
| 2,414,411 | Marks | Jan. 14, 1947 |